INVENTOR:
Joseph F. Joy.
BY: John F. Schmidt
ATTORNEY.

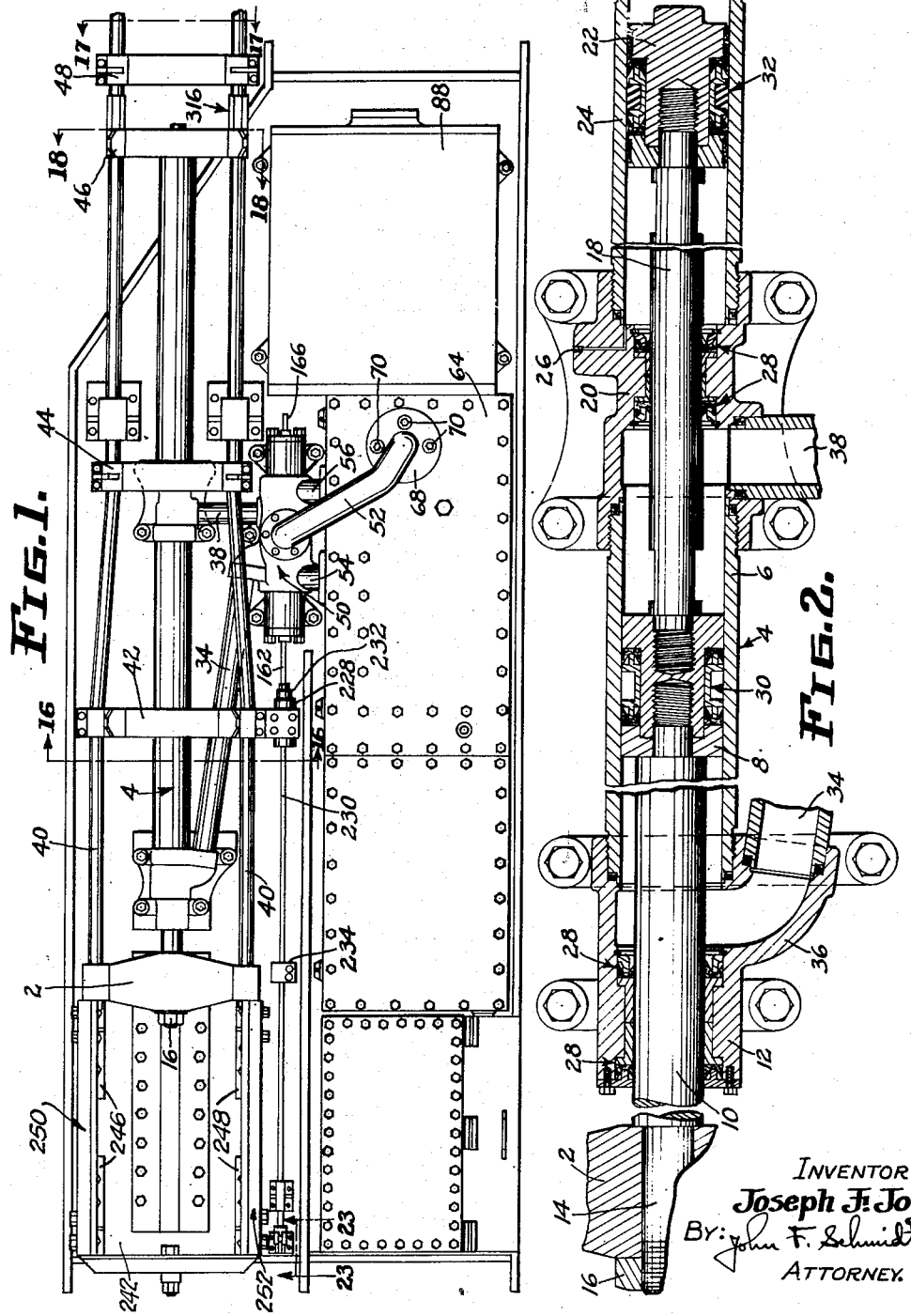

Dec. 14, 1954    J. F. JOY    2,696,906
SHAKER CONVEYER
Filed Jan. 29, 1949    8 Sheets-Sheet 3
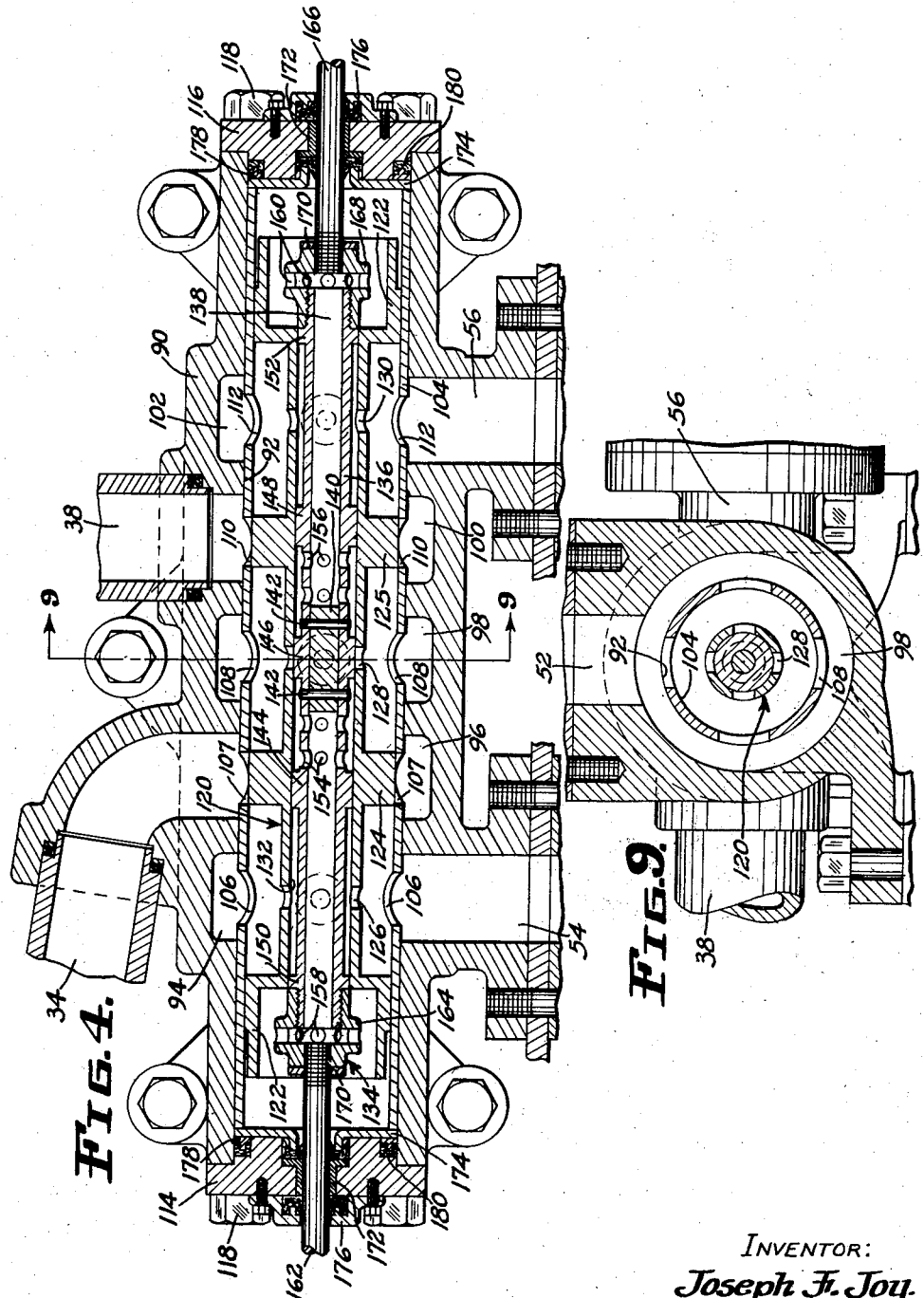
INVENTOR:
Joseph F. Joy.
BY: John F. Schmidt
ATTORNEY.

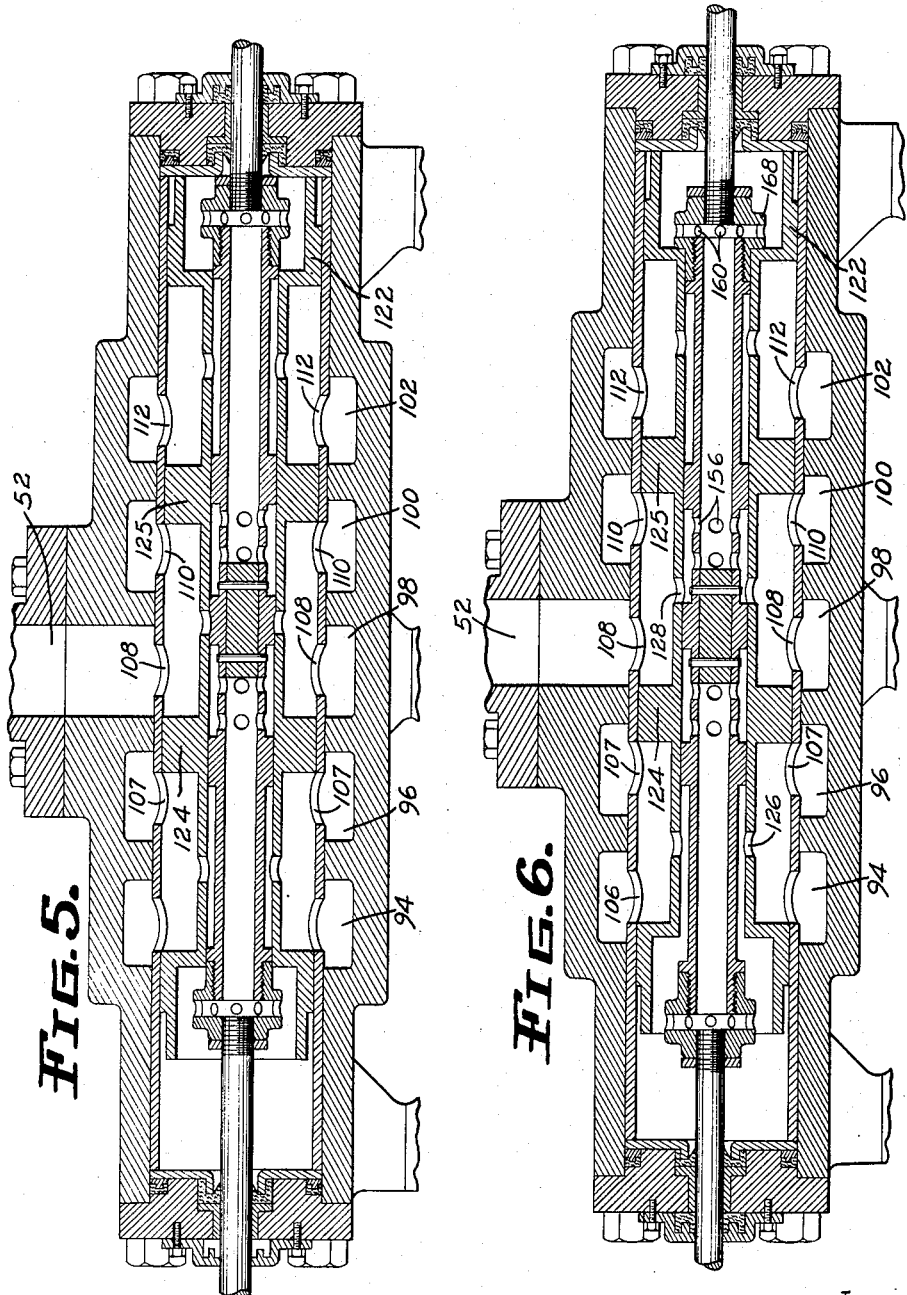

Dec. 14, 1954     J. F. JOY     2,696,906
SHAKER CONVEYER
Filed Jan. 29, 1949     8 Sheets-Sheet 5
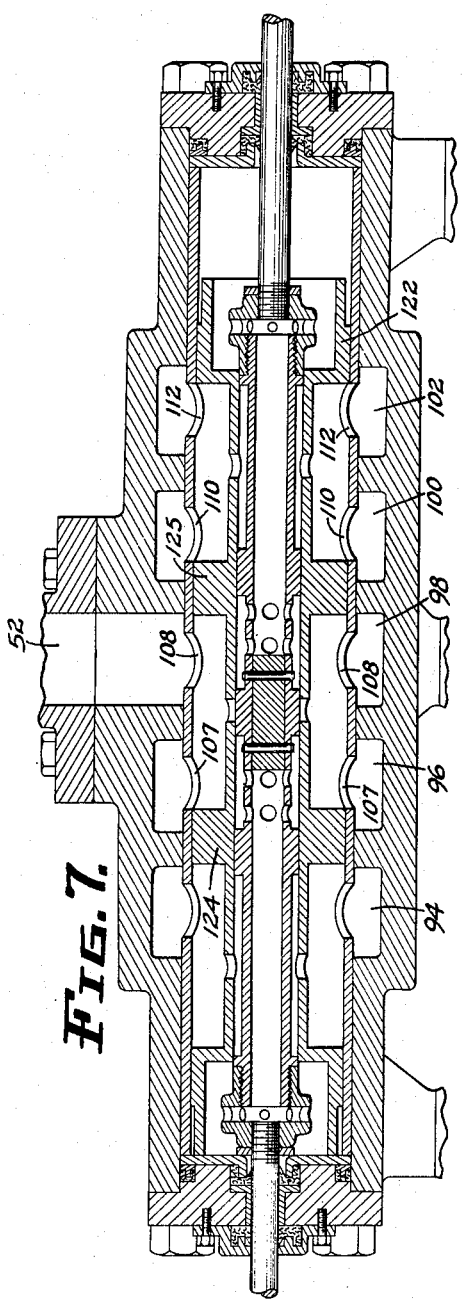
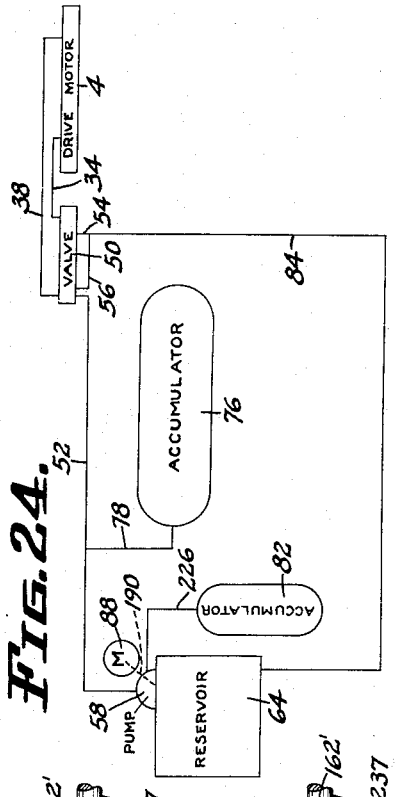
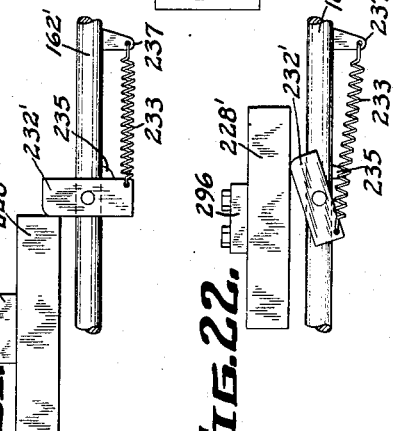
INVENTOR:
Joseph F. Joy.
By: John F. Schmidt
ATTORNEY.

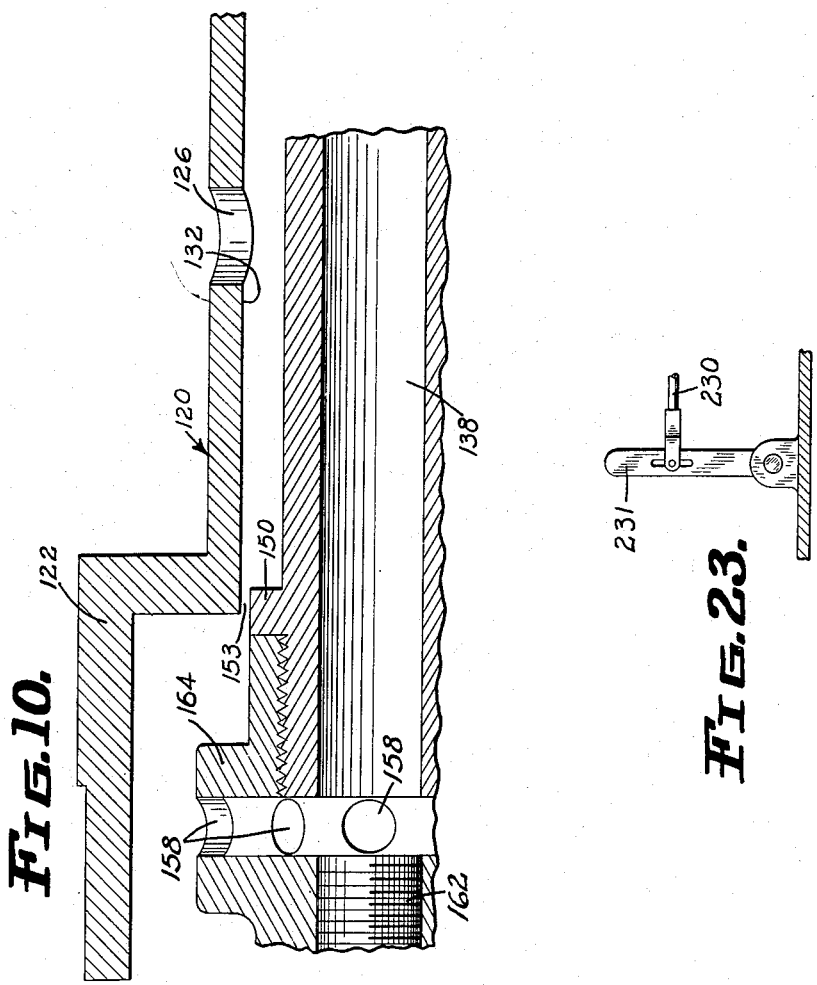

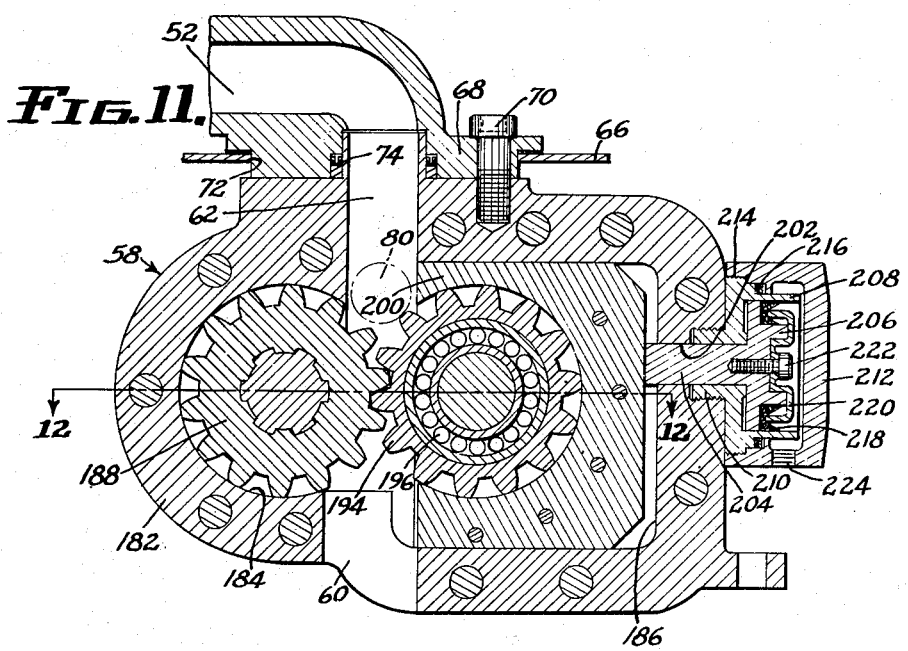
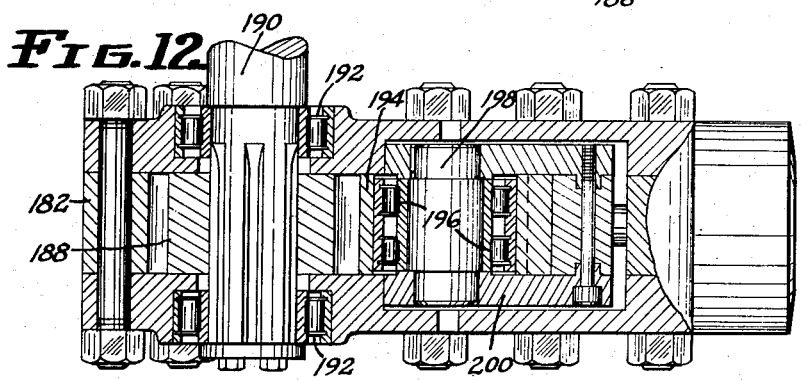
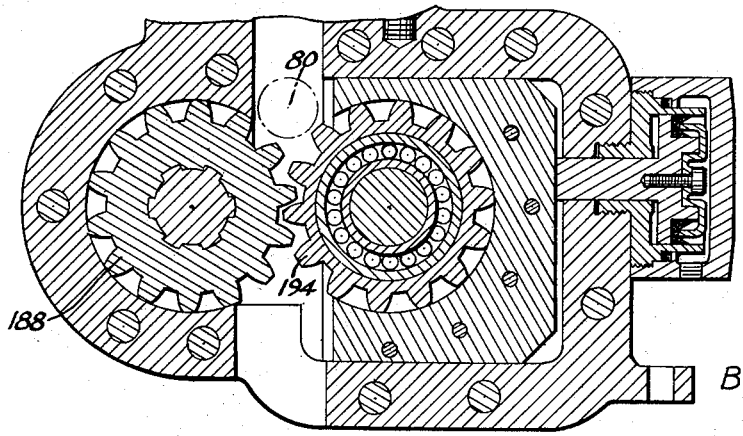

Dec. 14, 1954  J. F. JOY  2,696,906
SHAKER CONVEYER
Filed Jan. 29, 1949  8 Sheets-Sheet 8
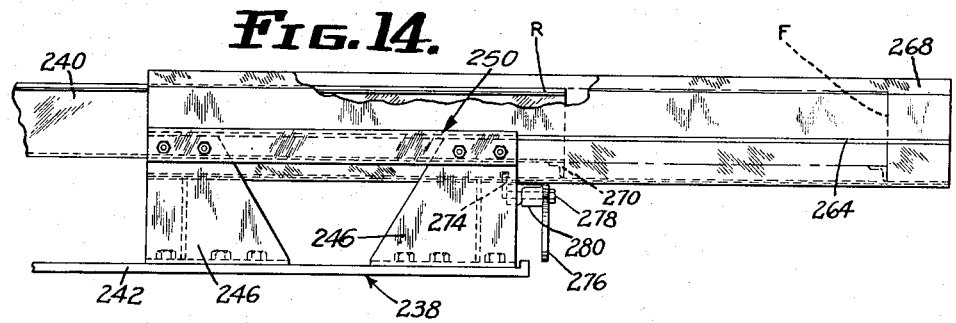
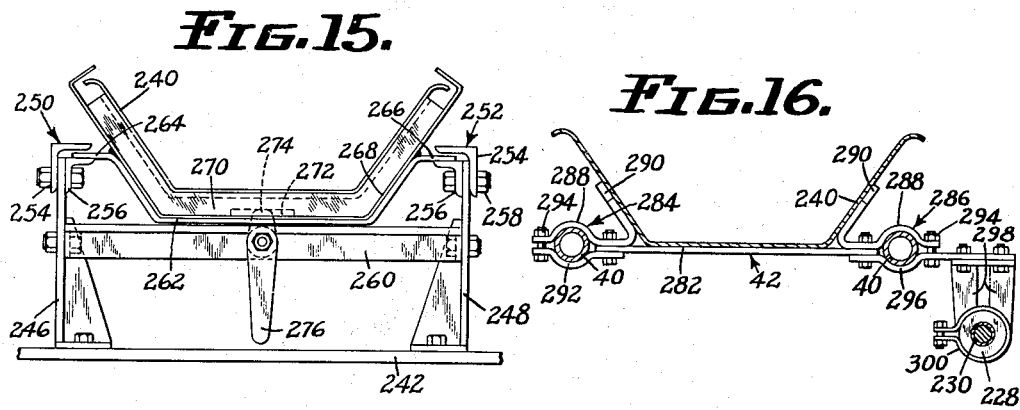
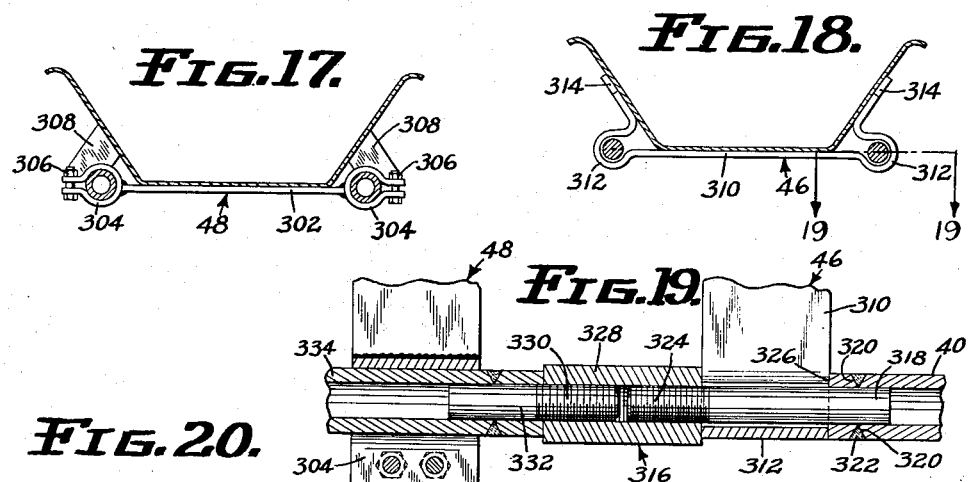
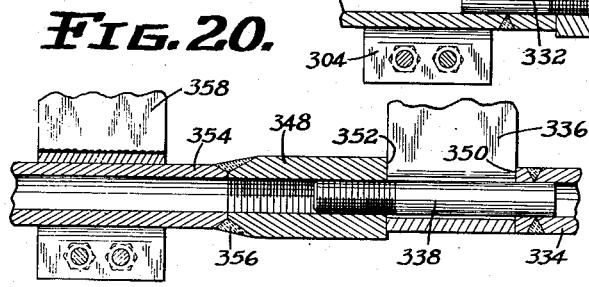
INVENTOR:
Joseph F. Joy
By: John F. Schmidt
ATTORNEY.

United States Patent Office 2,696,906
Patented Dec. 14, 1954

2,696,906

SHAKER CONVEYER

Joseph F. Joy, Pittsburgh, Pa., assignor to Joy Manufacturing Company, Pittsburgh, Pa., a corporation of Pennsylvania Application January 29, 1949, Serial No. 73,625

12 Claims. (Cl. 198—220)

This invention relates to shaker conveyors, especially to hydraulically driven shaker conveyors.

The rapid movement of materials has recently become increasingly important in industry. An example which may be cited is the need for rapid movement of coal that goes with recently improved methods of tearing the coal loose from the face. Other examples in industry will be evident to those skilled in the art.

In the case of shaker conveyors, the problem is to keep the material in motion, created by the fact that the conveyor must operate through a return stroke during which part of the cycle no forward momentum is imparted to the material being conveyed. It is highly desirable to give the material a high forward velocity during the working stroke in order that it may remain in motion during the return stroke of the conveyor, and to keep the time duration of the return stroke to a minimum because the return stroke of the conveyor involves lost time in the operating cycle.

In attempting to solve the foregoing problems it is further necessary to bear in mind that many industrial applications will have limitations on the power available, and for that reason peak power requirements must be kept at a minimum.

It is accordingly an object of this invention to provide a much more efficient shaker conveyor than has heretofore been developed, a conveyor having a long stroke which can impart a high velocity to the transported material during the working or forward stroke, such that the material continues its forward motion during the very rapid return stroke and until the conveyor again moves forward to impart motion to the material. It is a further object of this invention to provide a hydraulic shaker conveyor with suitable controls, such that maximum power requirements may be kept within reasonable and practicable bounds.

These and other objects are achieved in a hydraulic shaker conveyor provided with a reversible hydraulic motor, to which fluid is supplied by a variable displacement pump. Regulation of the pump, to prevent exceeding a predetermined maximum load, is achieved by an accumulator connected to the pump. Another accumulator in the fluid supply line from the pump serves as a pressure fluid reservoir, storing up fluid under pressure when the demand by the motor is less than pump capacity and delivering such stored fluid when demand is greater than pump capacity; thus the peak power requirements are diminished substantially.

The reversible motor comprises a cylinder having a piston reciprocable therein, and fluid supply thereto is effected through a unique reversing valve which is itself controlled by the position of the conveyor drive head. In order to maintain better control of the material at the conveyor discharge end, a unique material receiver is provided to receive material from the terminal shaker pan and assure its delivery or discharge from the conveyor at a determinable discharge point.

In the drawings:

Fig. 1 is a top plan view of a shaker conveyor drive head and associated mechanism made according to the invention, with the shaker pans removed.

Fig. 2 is a view in section through the longitudinal axis of the drive cylinder comprising the hydraulic motor.

Fig. 4 is a longitudinal sectional view through the reversing valve showing the valve in a neutral position. The position shown in Fig. 4 is not an operating position.

Fig. 5 is another longitudinal sectional view of the reversing valve but with the plane of the section being perpendicular to the plane of the section of Fig. 4 and showing the valve in an operating position.

Fig. 6 is a view similar to Fig. 5, showing the valve in an operating position in which fluid is admitted to one end thereof to shift the valve to another operating position.

Figs. 7 and 8 are sectional views similar to Fig. 5 but showing the valve in other operating positions.

Fig. 9 is a view in section on line 9—9 of Fig. 4.

Fig. 10 is an enlarged detail view of a portion of the valve as shown in Fig. 7, but on a scale approximately four times that of Fig. 7.

Fig. 11 is a view in section through the variable displacement pump showing details thereof.

Fig. 12 is a view in section substantially on line 12—12 of Fig. 11.

Fig. 13 is a view in section similar to Fig. 11 but showing the pump gears with their centers separated somewhat in order to reduce the displacement of the pump.

Fig. 14 is a side elevation view of the discharge end of the conveyor showing the material receiver of the conveyor in its relation to the terminal shaker pan.

Fig. 15 is an elevation view as seen from the right end of Fig. 14 (front or discharge end of the conveyor).

Fig. 16 is a view in section substantially on line 16—16 of Fig. 1 showing details of the pan carrying mechanism.

Fig. 17 is a view in section on line 17—17 of Fig. 1.

Fig. 18 is a view in section on line 18—18 of Fig. 1.

Fig. 19 is an enlarged view in section substantially on line 19—19 of Fig. 18.

Fig. 20 is a sectional view on a horizontal plane similar to that of Fig. 19 but showing the rod connection between shaker pans ahead of those pans carried by the drive head.

Fig. 21 is a detailed view showing a possible modification in the trip mechanism for the pilot valve member of the reversing valve.

Fig. 22 shows the mechanism of Fig. 21 but in a different operating position.

Fig. 23 is a side elevation view of a detail of the valve actuating mechanism, as though it were a view in section on line 23—23 of Fig. 1.

Fig. 24 is a schematic diagram of the hydraulic circuit of a shaker conveyor head made according to the invention.

Figure 3:
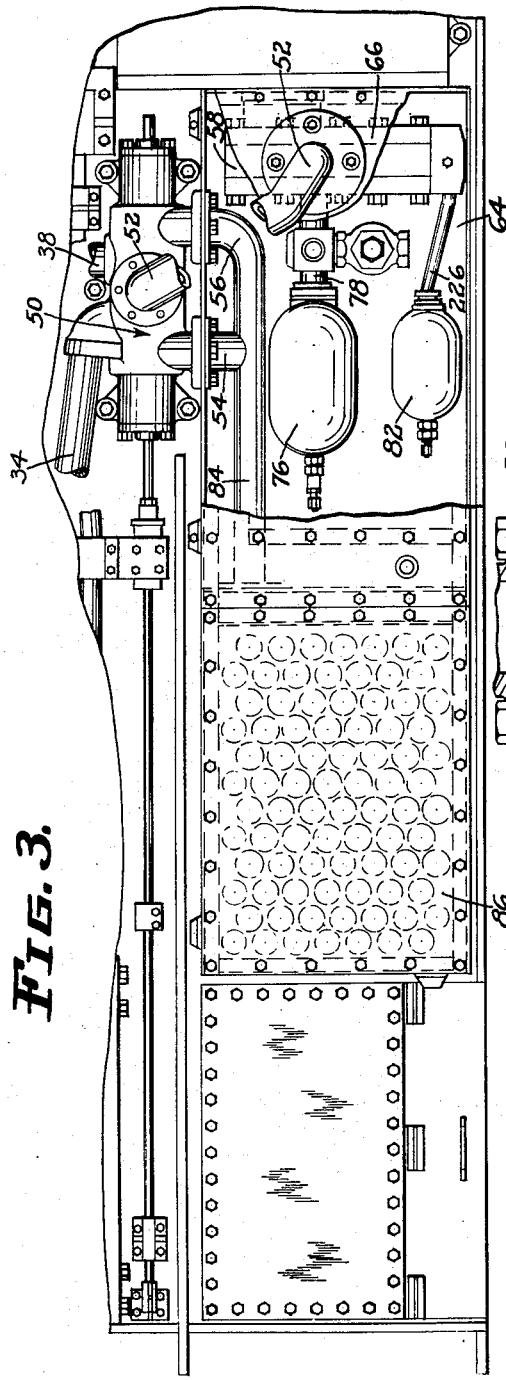
Fig. 3 is a view somewhat similar to Fig. 1 but on a larger scale and with parts broken away and in section to show certain details not shown in Fig. 1.

Referring now in detail to the drawings, especially Fig. 1, a crosshead 2 is mounted for reciprocation by a hydraulic fluid-operated motor 4. As is best seen in Fig. 2, fluid motor 4 comprises a cylinder 6 and an operating piston 8. A piston rod 10 extends through suitable packing in the stuffing box 12 and connects with the crosshead 2 by means of a reduced diameter portion 14 at the end of piston rod 10 and a threaded member 16 on the end of the reduced diameter portion 14.

At the end of piston 8 opposite piston rod 10 there is mounted a guide rod 18 which extends through a stuffing box 20. Guide rod 18 carries a piston 22, which operates in a cylinder 24. Cylinder 24 is preferably pressurized, i. e., charged with nitrogen or air and serves as a buffer to cushion the stopping of the main drive piston 8 at the end of each stroke. In order to permit the charging of cylinder 24 at opposite sides of the piston 22, cylinder 24 is provided with connections 26. The left end of cylinder 24 is preferably charged to a higher pressure to assist in giving the head the faster acceleration desired on the return stroke.

It will be understood by those skilled in the art that suitable packing indicated generally at 28 will be used in the stuffing boxes 12 and 20, and also that suitable sealing means indicated generally at 30 and 32 will be provided for the pistons 8 and 22 respectively. The details of the packing and sealing means do not per se form a part of this invention, and are, therefore, not described herein.

A pressure-fluid conduit 34 is connected to supply fluid to one end of cylinder 4 through a connection 36. A second pressure-fluid conduit 38 is connected to supply fluid under pressure to the opposite end of cylinder 4. It will be noted that piston rod 10 is larger in diameter than guide rod 18, so that for a given rate of hydraulic fluid supply to the cylinder, piston 8 will move faster to the right, as seen in Fig. 2, than it will to the left.

It may be noted here that the crosshead 2 is connected by drive rods 40 with pan brackets 42, 44, 46 and 48. The details of these pan brackets and their connections with the drive rods 40 will be disclosed below.

The supply of pressure fluid to the drive cylinder 4 is controlled by a reversing valve indicated generally at 50. Fluid under pressure is supplied to reversing valve 50 through a conduit 52, and fluid flows from the valve through two low pressure fluid connections 54 and 56.

Fluid under pressure is supplied to valve 50 through the aforesaid high pressure fluid conduit 52 by means of a variable displacement pump 58, having an inlet 60 and an outlet 62 (Fig. 11). Pump 58 is preferably mounted in a fluid reservoir 64 with its intake passage 60 submerged or immersed in hydraulic fluid. This mounting is effected by securing the pump casing to the cover 66 of the fluid reservoir by any suitable means such as is shown in detail in Fig. 11. As can be seen in that figure, the high pressure fluid conduit 52 terminates in a flanged connection 68, which communicates directly with the pump outlet or discharge 62, and the pump is secured to the under side of the reservoir cover 66 by means of threaded members 70 passing through the flanged connection 68 and engaging threaded openings in the pump casing. The flanged connection 68 extends through an opening 72 in the reservoir cover 66 and the top of the pump casing abuts directly against the lower face of the flanged connection 68. Suitable oil seal means 74 are provided to assure a fluid tight connection between the flanged connection 68 and the pump outlet.

An accumulator of the enclosed bladder type, such as is disclosed in reissue Patent 23,437, is shown at 76. Accumulator 76 communicates with fluid conduit 52 by means of a conduit 78 which opens into the pump discharge at 80 (Fig. 11). This opening will not actually be visible in Figs. 11 and 13 because of the nature of the section, but it is thought desirable to show its location in relation to the rest of the parts of the pump. A second accumulator 82 of the same general type as the one shown at 76, is preferably connected to control the output of pump 58 in a manner which will be described in greater detail below.

The two low pressure fluid connections 54 and 56 empty into a discharge conduit 84 which conducts the exhaust fluid to a filter 86 through which the hydraulic fluid passes before it is recirculated through the system. It will be noted that for the sake of convenience, accumulators 76 and 82 and their associated connections with the system are mounted in the reservoir 64. Any suitable motor 88, preferably an electric motor, may be connected to drive the pump 58.

The reversing valve

The reversing valve will now be described in detail, special reference being had to Figs. 4 to 10. A substantially cylindrical shell 90 is provided with an internal bore 92 and a plurality of internal peripheral grooves 94, 96, 98, 100 and 102. The peripheral grooves communicate respectively with low pressure fluid connection 54, pressure-fluid conduit 34, high pressure fluid connection 52, pressure-fluid conduit 38, and low pressure fluid connection 56. If desired, the valve could be made with the peripheral grooves communicating directly with the bore, but a preferred form of construction is that shown, in which a sleeve 104 snugly fits the bore 92 of the shell 90.

Sleeve 104 is provided with a plurality of sets of ports 106, 107, 108, 110 and 112, which communicate respectively with peripheral grooves 94, 96, 98, 100 and 102. Thus, in the preferred embodiment of the invention, communication between two or more peripheral grooves is by way of the interior of sleeve 104 and the associated ports. The sleeve 104 is removably secured in bore 92 by means of end caps 114 and 116. These caps are held in place by any suitable means such as threaded members 118 passing through the end caps and engaging the shell 90.

A hollow elongated main valve member 120 is reciprocably mounted in the sleeve 104. Main valve member 120 is provided with end pistons 122 and a plurality of port closers 124 and 125 between the end pistons 122. In the embodiment shown, the end pistons and port closers are of substantially the same external diameter as, and cooperate with, the inside diameter of the sleeve 104 to open and close certain of the sleeve ports. As is best seen in Fig. 4, port closers 124 and 125 preferably have a dimension in the axial direction which is sufficient to close a port when the port closer is aligned therewith. It will be noted further that the main valve member 120 is itself provided with ports 126, 128 and 130. When the valve is in the central position shown in Fig. 4 these ports are aligned with ports 106, 108 and 112 respectively.

It was pointed out above that the main valve member 120 is hollow. This hollow consists of an internal bore 132 in which a pilot valve member indicated generally at 134 is mounted for reciprocation. The pilot valve member consists of a hollow elongated element 136, of which the hollow 138 is blocked substantially midway between its ends by a plug 140 held in place by means of pins 142.

The elongated member is provided at its exterior with port closers 144, 146 and 148. These port closers are in effect pistons which fill up the internal bore 132 of the main valve member and thus serve to block fluid passage in an axial direction through the main valve member. In addition, the elongated member is provided with end pistons 150 and 152 which also have an external diameter such as to be reciprocable in and substantially block the internal bore 132 of the main valve member. As is best seen in Fig. 10, the end pistons 150 and 152 are preferably somewhat smaller than bore 132 to provide a clearance 153 and to permit a throttling effect in operation. The hollow elongated element of the pilot valve member is further provided with ports or fluid passages 154 and 156 at opposite sides of the plug 140 and with radial fluid passages 158 and 160 at its ends.

An actuating rod 162 threadedly engages the end 164 of the pilot valve member and a guide rod 166 threadedly engages the opposite end 168 of the pilot valve member. A suitable lock nut 170 engages the threaded portions of rods 162 and 166 to guard against loosening of the threaded connections. As will be well understood by those skilled in the art, the rods 162 and 166 pass through stuffing boxes 172, of which the packing and gland are secured between a flanged member 174 and a stuffing box cap 176. The flanged member 174 engages an end of sleeve 104 and also serves to hold a seal 178 in place in annular recess 180 provided in each of end caps 114 and 116.

The subject matter of the reversing valve described in the foregoing is not claimed herein, but forms the basis of a separate application, Serial No. 248,573, filed September 27, 1951, and assigned to the assignee of this invention.

The variable displacement pump

Reference is now had to Figs. 11, 12 and 13 for a description in detail of the variable displacement pump. The pump 58 has a pump casing 182 provided with a substantially circular recess 184 at one end thereof and a substantially rectangular recess 186 at its other end. A gear 188 is mounted for rotation in the recess 184 and is keyed to motor shaft 190, which is rotatably supported in antifriction bearings 192.

Meshing with drive gear 188 is a follower gear 194 which is mounted for rotation on antifriction bearings 196 on a short shaft 198. Shaft 198 is in turn supported in a block 200 which has limited movement in the rectangular recess 186 in a direction parallel to a line connecting the axes of rotation of gears 188 and 194.

Gear casing 182 is provided at its right end with a bore 202 in which a piston rod 204 has a sliding fit. One end of rod 204 abuts against the right hand face of block 200, and at the other end of piston rod 204 there is a piston 206 adapted to reciprocate in a cylinder 208; the cylinder is held in place by a threaded boss 210 secured in a threaded recess in the gear casing. A cylinder head 212 threadedly engages the cylinder 208 at 214. Suitable sealing means 216 are provided between the cylinder and the cylinder head, and suitable piston packing 218 is held in place by a washer 220, which itself is secured to the piston by a threaded member 222.

As can be seen in Figs. 11 and 13, there is a clearance between the right end of cylinder 208 and the end of cylinder head 212. This clearance permits the interior of the cylinder to communicate with fluid connection 224. Fluid connection 224 is provided in order that accumulator 82 may communicate with the cylinder interior by way of a conduit 226 (Fig. 3).

The subject matter of the variable displacement pump referred to in the foregoing is not claimed herein, but forms the basis of a separate application, Serial No. 246,605, filed September 14, 1951, and assigned to the assignee of this invention.

The pilot valve actuating means

The pilot valve member of the reversing valve must be actuated by some means in order to effect reversal of the fluid operated motor. The pilot valve is actuated by reciprocation of the shaker conveyor drive head as will now be described in greater detail.

Pan bracket 42 (Figs. 1 and 16) carries an extension at its one end, to which there is secured a block 228. The block 228 is hollow to permit the passage therethrough of actuator rod extension 230. Extension 230 is threadedly connected at its one end to a dog 232, which in turn is threaded onto the end of actuator rod 162. Rod extension 230 carries another dog 234 which is adjustable along the rod in order to vary the length of stroke of the shaker conveyor. A handle 231 (Fig. 23) is preferably attached to rod 230 in order that the pilot valve member may be moved manually into a valve actuating position from the neutral position shown in Fig. 4, just in case the apparatus should shut down with the parts in neutral.

Alternative means for actuating the pilot valve may be provided if desired as shown in Figs. 21 and 22. In this alternative embodiment the mechanism is designed to permit over-travel of the actuating block, here shown as actuating cam 228'. In this alternative embodiment the pilot valve actuating rod 162' carries a pivoted dog 232'. The dog 232' is held in position to be engaged by the cam 228' by a coil spring 233 which holds the dog 232' against a stop 235. The coil spring is anchored at its other end to a spring bracket 237.

The shaker conveyor material receiver

Reference is now made to Figs. 14 and 15 for a detailed description of the material receiver. The stroke of a shaker conveyor made according to this invention is preferably long in order to permit the material being conveyed to attain a high velocity of movement. It should be noted that the structure illustrated in Fig. 14 appears end-for-end, as it were, with respect to Fig. 1, the view of Fig. 14 being what would be seen by an observer looking towards the longitudinal center line of Fig. 1 from a point beyond the upper side of that figure. A conveyor having such a long stroke and discharging its material in a conventional manner will discharge the material over an area having a substantial linear dimension in the direction of movement of the shaker pans. This fact makes for difficulty in collecting the material discharged from the conveyor; the material receiver of this invention overcomes that difficulty, permitting discharge of the material at a fixed and determinable place.

A support 238 is provided in the vicinity of the terminal shaker pan 240 in the pan line. The support consists of a base member 242 in contact with the ground, mine bottom, or the like. Desirably the base member 242 may form a portion of the base of the structure illustrated in Fig. 1. Mounted on the base 242 are upright brackets 246 and 248, the brackets 246 being disposed at one side of the pan line, and the brackets 248 at the opposite side of the pan line. Brackets 246 and 248 support a pair of guides 250 and 252 respectively. Each of guides 250 and 252 consists simply of a pair of angle members 254 and 256 mounted at opposite sides of its associated upright bracket 246 or 248 by any suitable means as, for example, by the nut and bolt assembly 258. The relative sizes of the angles 254 and 256 are so chosen as to provide a horizontal space therebetween as is best seen in Fig. 15. A cross brace 260 is preferably provided to add rigidity to the support 238.

A pan carrier 262 is provided with laterally extending members 264 and 266 engaging guides 250 and 252 respectively. A receiving pan 268 is secured to the pan carrier 262 by any suitable means as, for example, by welding. If desired, the laterally extending guide members 264 and 266 may be secured directly to the pan 268 instead of being mounted on a pan carrier as shown. In what follows it will be helpful to bear in mind that the term "forward," used with respect to a shaker conveyor, is essentially equivalent to discharge—thus the forward end of a shaker conveyor is the discharge end thereof—whereas the end of the conveyor referred to as the rearward end is the end at which the tail piece is located and away from which material is adapted to be conveyed towards the discharge end.

In Fig. 14, the terminal shaker pan 240 (the pan at the discharge end of the conveyor) is shown in solid lines at R, in its extreme rearward position, and is shown in dotted lines at F in its extreme forward position. It can be seen in Fig. 14 that the receiving pan 268, in its operating position, extends forward beyond the forward end of the shaker pan when the shaker pan is in its extreme forward position, and the receiving pan 268 also extends rearward further than the extreme rearward position of the forward end of the terminal shaker pan.

The under side of the terminal shaker pan is provided with a pusher member 270 at its extreme forward end, preferably in the form of an angle member bent to conform to the trough-like configuration of the pan. As can be seen in the drawings, the pusher member preferably just barely touches the receiving pan.

Provision is made to allow the receiving pan to be pushed back in the direction toward the mine face out of the way of such activity as may be necessary at the very end (the discharge end) of the pan line. To that end the receiving pan is slidably mounted on its support as is described in detail above, and also means are provided to lock the receiving pan in operating position. For that purpose, the receiving pan and the pan carrier are notched or recessed as shown at 272 to receive a detent 274, which may be moved into and out of the recess by a handle 276. More specifically, the detent 274 may be secured to handle 276 by a bolt 278. The detent and handle assembly may be rotatably mounted in a bearing 280, which may in turn be conveniently mounted on the cross brace 260.

Pan connectors and pan brackets

The pans used to transport the material to be conveyed have a trough-like configuration when seen in cross section, as shown in Figs. 16, 17 and 18. As is best seen in Fig. 16, pan bracket 42 is clamped to drive rods 40 to be reciprocated thereby, and the shaker pan may be, and preferably is, welded thereto in any suitable manner. The pan bracket itself consists of a transverse member 282, to the opposite ends of which there are bolted clamps 284 and 286. Each of these clamps includes an upper clamping element 288 which is bent into a V at its inner end to provide a pan-engaging arm 290, and which engages the drive rod at its outer end. Clamping element 288 of clamp 284 cooperates with another clamping element 292, and the two elements are held together at their outer end by a nut and bolt assembly 294 to clamp the drive rod 40 between them.

Clamping element 288 of clamp 286 cooperates with another clamping element 296. As in the case of clamp 284, a nut and bolt assembly 294 holds the two elements 288 and 296 tightly clamped about drive rod 40. The outer end of clamping element 296 extends laterally further than the outer end of clamping element 292 in order that element 296 may support the actuating block 228 which serves to reverse the pilot valve as described above. As is more readily seen in Fig. 16, block 228 is suspended from element 296 by means of a pair of hangers 298, which carry a clamp 300. Clamp 300 engages and holds the aforesaid block 228.

Fig. 17 shows details of the pan bracket 48. As can be seen by reference to Fig. 17, pan bracket 48 consists of a cross member 302, to each end of which a clamp 304 is secured as by welding. Each clamp 304 consists simply of an open loop with a nut and bolt assembly 306 passing through the end. An upright arm 308 secured to the upper face of each clamp 304 engages one side of the trough-like shaker pan. The pan is also preferably welded to bracket 48.

The details of pan bracket 46 are shown in Fig. 18, and the means by which bracket 46 is secured for reciprocation by the drive head can best be understood by a consideration of Fig. 19 as well as Fig. 18. As is best seen in Fig. 18, pan bracket 46 is preferably a single piece having a transverse portion 310 bent in the vicinity of its outer ends to form loops 312, the ends of which in turn are bent upward and outward to form pan-engaging arms 314.

Fig. 19 shows in detail the rod connection shown at 316 of Fig. 1. As can be seen in Fig. 19, drive rod 40 is a hollow member in the end of which a stud 318 is secured, preferably by drilling a plurality of peripherally spaced holes 320 and, with the stud 318 in place, filling the holes 320 with weld metal 322. The outer end of stud 318 may be threaded as shown at 324, either before or after the stud is welded into the end of rod 40.

The end of rod 40 forms a shoulder 326. The loop 312 of pan bracket 46 slips over stud 318 and is clamped between shoulder 326 and the face of a nut 328. Nut 328 is long enough to extend beyond the threaded end 324 of the stud and is thus long enough to receive the threaded end 330 of a stud 332 welded as explained above in the end of a pan drive rod 334. Pan bracket 48 is secured to the end of pan drive rod 334 as explained above.

The connections of adjacent pan drive rods in the direction of the mine face or other source of material to be conveyed, are shown in detail in Fig. 20. It may be assumed that pan bracket 48 supports one end of a shaker pan which extends to the right as seen in Fig. 1, and to the left as appears in Fig. 19. The other end of that pan is supported by a pan bracket shown at 336 in Fig. 20. One end of pan drive rod 334 appears in Fig. 19 and the other end thereof is shown in Fig. 20. As before, stud 338 is welded in the end of drive rod 334. Stud 338 extends through the loop of pan bracket 336, which is substantially identical with pan bracket 46 (Fig. 18), and the outer threaded end of stud 338 extends beyond pan bracket 336 and is engaged by a nut 348. Thus, the loop of pan bracket 336 is clamped between shoulder 350 of rod 334 and face 352 of nut 348. Nut 348 is welded to another pan drive rod 354 as shown at 356, and a pan bracket 358 of the next adjacent pan is clamped about drive rod 354 near its point of attachment to nut 348. Pan bracket 358 is substantially identical to pan bracket 48 (Fig. 17).

*Operation*

For a quick summary of the operation, reference should be made to Fig. 24. The pump inlet is immersed in hydraulic fluid in the reservoir and discharges fluid into the high pressure fluid connection 52. The reversing valve admits fluid first to one end of the drive motor 4 and then to the other end of drive motor 4. Fluid discharged from the drive motor passes through the reversing valve and returns to the reservoir by way of return line 84 (passing also through the filter 86 shown in Fig. 3).

At the beginning and end of each stroke the output of pump 58 is greater than the demand for hydraulic fluid by the fluid-operated motor, in this case the drive motor 4. When the fluid-operated motor is moving at maximum speed in either direction, the requirement for hydraulic fluid is greater than the capacity of the pump. When the demand for fluid is less than pump capacity, the excess is stored in accumulator 76 and when the demand for fluid is greater than pump capacity, accumulator 76 discharges fluid into high pressure fluid connection 52.

The operation of the fluid-operated motor and the reversing valve will now be taken up in greater detail. Let it be assumed that the description of the operation begins with the main valve member and the pilot valve member at the extreme right limits of travel (Fig. 5). Let it further be assumed that the drive head is nearing the end of its travel toward the left as seen in Fig. 1. As it nears the end of its leftward travel the block 228 engages dog 234 and pulls the pilot valve member leftward into the operating position shown in Fig. 6. Thereupon, fluid under high pressure is admitted from the high pressure fluid connection 52 into peripheral groove 98, whence it passes through ports 108 in the sleeve 104, ports 128 in the main valve member, into the annular space between the main valve member and the pilot valve member, through ports 156 in the pilot valve member, along the right half of the hollow pilot valve member, and out through radial ports 160 in the end 168 of the pilot valve member, whereupon fluid at high pressure is admitted to the right end of main valve member 120 and also to the right end of the pilot valve member.

Figure 8:
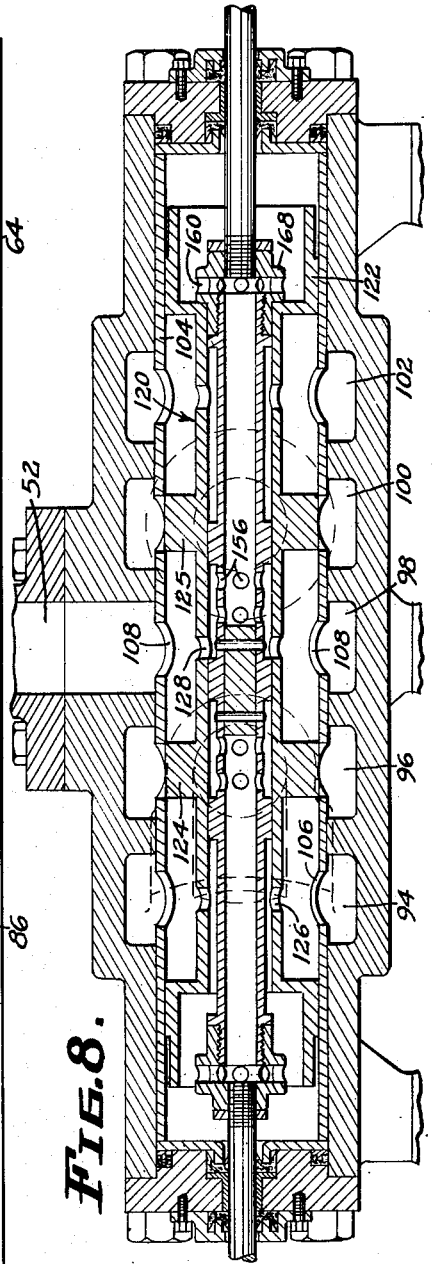

Also, with the parts in this position, the left end of the main valve member is open to the low pressure fluid connection 54 by way of the annular passage between the main valve member and the pilot valve member, ports 126 in the main valve member, ports 106 in the sleeve, and peripheral groove 94. With the high fluid pressure at the right end of the main valve member and the pilot valve member, and low pressure at the left end, the system is unbalanced so far as pressure is concerned. As a result, the main valve member and pilot valve member move rapidly toward the left into the position shown in Figs. 7 and 10. The pilot valve member will reach the end of its travel first, and as the main valve member nears the end of its travel, end piston 150 enters the end of bore 132. The clearance 153 provides a throttling effect which cushions the stopping of the main valve member. If the main valve member should stick momentarily, it will be started toward the left mechanically by the pilot valve member, as shown in Fig. 8.

It should be remembered that meanwhile the shaker conveyor drive head has reached the end of its stroke in a leftward direction. With the valve parts occupying the relative positions shown in Fig. 7, high pressure fluid passes from the high pressure fluid connection 52 into peripheral groove 98, through ports 108 in the sleeve, into the annular space between the sleeve and the main valve member and between port closers 124 and 125, through ports 107 in the sleeve, into annular groove 96, and out through pressure fluid conduit 34 to connection 36 at the left end of motor 4. Fluid under high pressure is thereupon admitted to the left side of piston 8.

Meanwhile note that the right side of piston 8 is vented to the low pressure of the reservoir by way of pressure fluid conduit 38, peripheral groove 100, ports 110 in the sleeve, the annular space between the sleeve and the main valve member and between port closer 125 and right end piston 122, ports 112, annular groove 102, low pressure fluid connection 56 and exhaust conduit 84. This unbalance of pressures moves the piston 8 rapidly to the right as seen in Fig. 2.

Inasmuch as the valve is symmetrical, the operation in the other direction is the same as the operation just described so the other half of the cycle need not be described in detail, but will be understood by those skilled in the art from the description given above.

As was explained earlier in this description, and as is best seen in Fig. 2, piston rod 10 is larger in diameter than guide rod 18, which will result in a faster travel of the drive piston toward the right than toward the left. With this arrangement the slow or working stroke will be toward the left and the return or idler stroke will be toward the right, and the material transported will be moved leftward by the shaker conveyor.

Further attention is invited at this time to cylinder 24 (Fig. 2). As was explained above, cylinder 24 has reciprocating therein a piston 22, which is connected to guide rod 18 and moves against air or nitrogen under pressure in cylinder 24 at both sides of the piston 22. Cylinder 24 thus stores up energy which is put back into the system when piston 30, and therefore, piston 22, have reached the end of a stroke and move in the other direction, serving to start movement immediately in said other direction. Because of the higher pressure on the left side of piston 22, the acceleration will be greater on the return stroke. In addition, cylinder 24 serves as a shock absorber to slow down the shaker conveyor drive head near the end of each stroke by compressing the gas in that end of cylinder 24 toward which piston 22 happens to be moving.

It will of course be appreciated that in all normal operation of the invention, fluid pressure moves the pilot valve in the same direction as it is moved by the block 228 cooperating with dog 232 or dog 234 according to the direction in which the block happens to be moving. To put it another way, assuming that block 228 engages dog 234 to initiate movement of the pilot valve member leftward, as soon as the appropriate valve passages are provided through the valve, fluid pressure continues to move the pilot valve leftward and will ordinarily move the dog out of the way of the block 228.

As a safety measure, however, it may be desirable to use a cam and dog mechanism which permits over-travel of the cam. Such a mechanism is shown in Figs. 21 and 22 and was described above. In describing the operation of a mechanism made according to the modification shown in Figs. 21 and 22, let it be assumed that the shaker head is moving toward the right. Cam 228' engages the pivoted dog 232'. Pivoting of the dog is resisted by the coil spring 233 and the resistance of this spring is sufficient to force movement of the pilot valve member without allowing pivoting of the dog 232'. If now the cam 228' has moved the actuating rod 162' as far to the right as it can go, and the shaker conveyor drive head still has not reached the limit of its rightward travel, then the cam 228' will cause the dog 232' to pivot against the resistance of spring 233 as shown in Fig. 22. Cam 228' will be made long enough to assure that it will not ride off the pivoted dog in the direction of over-travel. The expedient shown in Figs. 21 and 22 also prevents damage to the mechanism in the event of sticking of the pilot valve member for any reason.

Regulation of the variable displacement pump will now be described in detail. There are many industrial applications for shaker conveyors in which it will be necessary, or at least desirable, to guard against over-loading of the pump drive motor. Such a safeguard is provided in the design of variable displacement pump shown in Figs. 11, 12 and 13. As was described above, the accumulator 82 is connected by means of a conduit 226 to the cylinder 208. As will be understood by those skilled in the art, accumulator 82 will be so large that the volume change effected in the accumulator by the travel of piston 206 throughout its limits will be negligible, and accordingly, the pressure imposed upon piston 206 will be substantially constant. Under those circumstances, the resistance to relative displacement of the two pump gear centers imposed by the piston and the accumulator will be substantially constant. This will result in providing a substantially constant load for the drive motor 88.

As the pressure in the discharge or outlet 62 of the pump exceeds the permissible maximum, gear 194 begins to move to the right against the resistance of the accumulator, thus serving to unload the pump. This unloading of the pump by moving the centers of the gears apart permits the pump discharge pressure to drop slightly and as soon as that pressure has again been reduced to a permissible value the two gears return from the separated relationship shown in Fig. 13 to the fully meshed relationship shown in Figs. 11 and 12.

It will be noted that the piston rod 204 abuts against the right face of block 200 at some point above a line drawn through the two gear centers and extended toward the right. The purpose of this eccentric application of the resistance force is to overcome the unbalance caused by higher pressure acting on the upper portion of block 200.

The operation of the material receiver will now be described in detail. Let it be assumed that the receiving pan 268 occupies its normal operating position as shown in Fig. 14. Let it further be assumed that the terminal shaker pan 240 is in its extreme forward position F as shown in dotted lines. As the terminal conveyor pan is pulled back sharply on the return stroke, the material to be conveyed moves out of the end of the terminal pan into the receiving pan until the terminal pan reaches the most extreme rearward position shown in full lines in Fig. 14. As the terminal pan then moves forward again on the next work stroke, the scraper or pusher member 270 on the underside of the terminal pan engages the material lying in the bottom of the receiving pan, and pushes it out and off the end of the receiving pan.

It will be understood by those skilled in the art that without a material receiver such as is disclosed herein, the transported material would be discharged from the conveyor over a linear dimension substantially equal to the length of stroke of the conveyor. Where this length of stroke is unusually long as in a drive head according to this invention—for example, 30 inches—this results in the transported material being deposited or discharged from the conveyor in such a manner as to make it difficult to load the material thus discharged. A material receiver such as is shown in this invention limits the discharge of the transported material to the point at which the receiving pan ends and thus makes loading of the discharged material relatively simple. This feature of the invention makes it easy for a conveyor of this type to discharge onto another conveyor at right angles thereto with a minimum of spillage.

With the conveyor temporarily stopped and the terminal shaker pan withdrawn to its most extreme rearward position, the receiving pan 268 may be moved back out of the way by turning handle 276 to disengage detent 274 from recess 272, whereupon pan 268 may be slid toward the rear by means of laterally extending members 264 and 266 sliding in guides 250 and 252. The way is then clear for the movement of mine cars or shuttle cars in front of the conveyor, or such other activity as may be necessary.

It will be evident from the foregoing that this invention provides a much improved and more efficient shaker conveyor having the numerous advantages referred to herein.

While there is in this application specifically described one form which the invention may assume in practice, it will be understood that this form of the same is shown for purposes of illustration, and that the invention may be modified and embodied in various other forms without departing from its spirit or the scope of the appended claims.

I claim:
1. A material receiver for a shaker conveyor having a terminal shaker pan, the material receiver comprising a support disposed in the vicinity of the terminal shaker pan, a pair of guides on the support at opposite sides of said pan, a receiving pan, means for supporting said receiving pan on said guides including members engaging the guides, the receiving pan being slidable back and forth along the axis of material movement, and means to lock the receiving pan against said back-and-forth sliding.

2. The combination of claim 1, in which the receiving pan supporting means comprises a pan carrier to which said members engaging the guides are secured.

3. In a shaker conveyor, a cylinder having a bore, a piston reciprocable in said cylinder bore and connected to drive the shaker conveyor, a second cylinder having a bore discontinuous from said first cylinder bore, a piston reciprocable in said second cylinder bore, the second cylinder being provided with a sealed charge of fluid under pressure, and a mechanical connection between the two pistons whereby compression and expansion of the fluid in the second cylinder decelerates and accelerates the shaker.

4. The combination of claim 3, in which the two cylinders are coaxial and adjacent, and in which the connection between the two pistons comprises a single rod.

5. In a shaker conveyor, cylinders separated by a stuffing box, a piston mounted for reciprocation in one cylinder and connected to drive the shaker conveyor, a piston mounted for reciprocation in the other cylinder, a rod connecting the two pistons and passing through the stuffing box, and a sealed charge of fluid under pressure in said other cylinder.

6. In a shaker conveyor, cylinders separated by a stuffing box, a piston mounted for reciprocation in one cylinder and connected to drive the shaker conveyor, a second piston mounted for reciprocation in the other cylinder, a rod connecting the two pistons and passing through the stuffing box, a sealed charge of fluid under pressure in said other cylinder to which one face of the second piston is exposed, and another sealed charge of fluid under pressure in said other cylinder to which the opposite face of the second piston is exposed.

7. A conveyor as in claim 6, in which one of the sealed charges is at a substantially higher pressure than the other.

8. In a shaker conveyor, a cylinder, a piston reciprocable in the cylinder and connected to drive the shaker conveyor, a second cylinder, a piston reciprocable in the second cylinder, the second cylinder being provided with a sealed charge of fluid under pressure acting on one face of the piston operating therein and a second sealed charge of fluid under pressure acting on the opposite face of the piston operating therein, and a mechanical connection between the two pistons.

9. In a shaker conveyor, a cylinder having a bore, a piston reciprocable in said cylinder bore, a piston rod connected with the piston and extending out through one end of the cylinder and connected to drive the shaker conveyor, a second cylinder having a bore, a piston reciprocable in the second cylinder bore, a piston rod connecting the two pistons and extending out through that end of the first cylinder which is opposite the first piston rod, the second piston rod having a smaller diameter than the first, and a sealed charge of fluid under pressure in the second cylinder.

10. A conveyor as in claim 9, in which the sealed charge acts on one face of the piston in the second cylinder, and there is another sealed charge of fluid under pressure in the second cylinder acting on the opposite face of the piston in the second cylinder.

11. In a shaker conveyor, in combination, a reversible hydraulic motor having two working faces of different areas in order to provide the characteristic of moving faster in one direction than in the other for a given fluid supply, a reversing valve, a pump, means including conduit means connecting the pump with the reversing valve and the reversing valve with the motor, and means charged with gas under pressure and associated with the hydraulic motor to accelerate said motor at the beginning of each stroke, said means having two chambers charged to different pressures such that the acceleration is greater in one direction than in the other direction, and the effects of greater hydraulic motor speed and greater acceleration being additive.

12. A shaker conveyor comprising: a reversible hydraulic motor of the piston-and-cylinder type, having a drive rod of a given cross-sectional area secured to the piston and extending out through one end of the cylinder, and a guide rod of a lesser cross-sectional area secured to the piston and extending out through the opposite end of the cylinder, whereby fluid supplied at a given rate to the first-named end of the cylinder will move the piston faster than fluid supplied at the same rate to the second-named end of the cylinder; a reversing valve; a fluid supply pump; means connecting the valve with the two named ends of the cylinder; means connecting the pump with the valve; means to drive the pump; and means charged with gas under pressure and associated with the hydraulic motor to accelerate said motor at the beginning of each stroke, said means having two chambers charged to different pressures such that the acceleration is greater in one direction than in the other direction, and the effects of greater hydraulic motor speed and greater acceleration being additive.

References Cited in the file of this patent

UNITED STATES PATENTS

| Number | Name | Date |
|---|---|---|
| 183,389 | Deane | Oct. 31, 1876 |
| 194,549 | Coombs | Aug. 28, 1877 |
| 209,227 | Chapin | Oct. 22, 1878 |
| 1,234,495 | Sargent | July 24, 1917 |
| 1,306,704 | Malinowsky | June 17, 1919 |
| 1,456,389 | Linkowski | May 22, 1923 |
| 1,633,465 | St. Clair | June 21, 1927 |
| 1,735,137 | Sklenar | Nov. 12, 1929 |
| 1,814,732 | Nyborg et al. | July 14, 1931 |
| 1,910,644 | Smith | May 23, 1933 |
| 1,997,495 | Moore | Apr. 9, 1935 |
| 2,204,770 | Rankin | June 18, 1940 |
| 2,239,521 | Hagenbook | Apr. 22, 1941 |
| 2,299,686 | Ernst | Oct. 20, 1942 |
| 2,333,338 | Rapp | Nov. 2, 1943 |
| 2,343,144 | Hagenbook | Feb. 29, 1944 |
| 2,454,484 | Sloane | Nov. 23, 1948 |
| 2,457,465 | Grosser | Dec. 28, 1948 |
| 2,458,077 | Jacobsen | Jan. 4, 1949 |
| 2,481,646 | Conklin | Sept. 13, 1949 |
| 2,501,235 | Rutherford | Mar. 21, 1950 |
| 2,626,042 | Aldridge | Jan. 20, 1953 |

FOREIGN PATENTS

| Number | Country | Date |
|---|---|---|
| 490,235 | Germany | Jan. 29, 1930 |
| 530,720 | Great Britain | Dec. 18, 1940 |